United States Patent
Jenkins et al.

(10) Patent No.: US 12,419,204 B1
(45) Date of Patent: Sep. 23, 2025

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventors: Ryan P. Jenkins, Oak Brook, IL (US); Andrea Vacca, West Lafayette, IN (US); Jacob Lengacher, Lafayette, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/673,629

(22) Filed: May 24, 2024

(51) Int. Cl.
*A01B 63/111* (2006.01)
*F15B 1/02* (2006.01)

(52) U.S. Cl.
CPC .......... *A01B 63/111* (2013.01); *F15B 1/024* (2013.01); *F15B 2211/20561* (2013.01)

(58) Field of Classification Search
CPC .......... F15B 1/021; F15B 1/024; F15B 21/14; A01B 63/111
See application file for complete search history.

(56) References Cited

U.S. PATENT DOCUMENTS

| | | | |
|---|---|---|---|
| 6,918,247 B1 * | 7/2005 | Warner | F15B 21/14 60/414 |
| 7,089,734 B2 * | 8/2006 | Cook | B66F 9/0655 60/413 |
| 7,434,391 B2 * | 10/2008 | Asam | F15B 1/024 60/414 |
| 8,418,451 B2 * | 4/2013 | Stanger | E02F 9/2271 60/414 |
| 8,938,956 B2 * | 1/2015 | Asam | E02F 9/2296 60/329 |
| 9,151,018 B2 * | 10/2015 | Knussman | E02F 9/2289 |
| 9,638,217 B2 * | 5/2017 | Yang | B66C 13/20 |
| 9,791,015 B2 * | 10/2017 | Kloft | E02F 9/2217 |
| 10,280,948 B2 * | 5/2019 | Vigholm | F15B 11/16 |
| 10,617,059 B2 * | 4/2020 | Dunn | F15B 1/021 |
| 11,268,072 B2 * | 3/2022 | Gruszka | C12N 7/00 |
| 11,668,072 B1 * | 6/2023 | Skeie | F15B 11/072 60/413 |

* cited by examiner

*Primary Examiner* — Michael Leslie
(74) *Attorney, Agent, or Firm* — Dority & Manning, P.A.

(57) ABSTRACT

An agricultural implement includes a tool moveable between a first position at which the tool engages soil within a field and a second position at which the tool is positioned above the soil. Furthermore, the agricultural implement includes a driven actuator including a driven rod coupled to the tool such that the driven actuator is configured to move the tool between the first and second positions. Additionally, the agricultural implement includes a regeneration actuator having a regeneration rod coupled to the tool such that the regeneration rod moves when the driven rod moves. Moreover, the agricultural implement includes an accumulator fluidly coupled to the regeneration cylinder such that, when the driven rod moves the tool toward the first position, the regeneration actuator supplies hydraulic fluid to the accumulator and, when the driven rod moves the tool toward the second position, the accumulator supplies the hydraulic fluid to the regeneration cylinder.

14 Claims, 5 Drawing Sheets

SYSTEM AND METHOD FOR CONTROLLING THE OPERATION OF AN AGRICULTURAL IMPLEMENT

FIELD OF THE INVENTION

The present disclosure generally relates to agricultural implements and, more particularly, to systems and methods for controlling the operation of agricultural implements.

BACKGROUND OF THE INVENTION

Modern farming practices strive to increase yields of agricultural fields. In this respect, seed-planting implements are towed behind a tractor or other work vehicle to disperse seed throughout a field. For example, many seed-planting implements include several laterally spaced row units, with each row unit forming a row of planted seeds within the field. In this respect, each row unit typically includes a furrow opening assembly (e.g., a disk opener(s)) that forms a furrow or trench in the soil. Furthermore, each row unit generally includes a seed-dispensing device (e.g., a seed meter and associated seed tube) that deposits the seeds into the furrow. After the deposition of the seeds, a furrow closing assembly (e.g., a pair of closing disks or wheels) closes the furrow in the soil.

The row units are generally moveable between a raised position and a lowered position. In this respect, when in the raised position, the row units are lifted out of the soil, such as to facilitate travel in the headlands of a field or along a road. Conversely, when in the lowered position, the various tools of the row units engage the soil to perform a seed-planting operation. As such, in some configurations, a system including one or more hydraulic actuators is used to move the row units between the raised and lowered positions. While such systems work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement including a frame and a tool supported on the frame, with the tool moveable between a first position at which the tool engages soil within a field and a second position at which the tool is positioned above the soil. Furthermore, the agricultural implement includes a driven actuator including a driven rod coupled to the tool such that the driven actuator is configured to move the tool between the first position and the second position. Additionally, the agricultural implement includes a regeneration actuator including a regeneration rod coupled to the tool such that the regeneration rod moves when the driven rod moves. Moreover, the agricultural implement includes an accumulator fluidly coupled to the regeneration cylinder such that, when the driven rod moves the tool toward the first position, the regeneration actuator supplies hydraulic fluid to the accumulator and, when the driven rod moves the tool toward the second position, the accumulator supplies the hydraulic fluid to the regeneration cylinder.

In another aspect, the present subject matter is directed to a system for controlling the operation of an agricultural implement. The system includes a tool moveable between a first position at which the tool engages soil within a field and a second position at which the tool is positioned above the soil. In addition, the system includes a driven actuator including a driven rod coupled to the tool such that the driven actuator is configured to move the tool between the first position and the second position. Furthermore, the system includes a regeneration actuator including a regeneration rod coupled to the tool such that the regeneration rod moves when the driven rod moves. Additionally, the system includes an accumulator fluidly coupled to the regeneration cylinder such that, when the driven rod moves the tool toward the first position, the regeneration actuator supplies hydraulic fluid to the accumulator and, when the driven rod moves the tool toward the second position, the accumulator supplies the hydraulic fluid to the regeneration cylinder.

In a further aspect, the present subject matter is directed to a method for controlling the operation of an agricultural implement. The agricultural implement, in turn, includes a tool moveable between a first position at which the tool engages soil within a field and a second position at which the tool is positioned above the soil. Moreover, the agricultural implement includes a driven actuator configured to move the tool between the first position and the second position. The method includes controlling, with a computing system, the operation of a first valve configured to control a pressurized flow of hydraulic fluid to the driven actuator such that the driven actuator moves the tool toward the first position. In addition, the method includes controlling, with the computing system, the operation of a second valve configured to control a flow of the hydraulic fluid between a regeneration actuator and an accumulator such that, when the tool moves toward the first position, the second valve opens to allow the hydraulic fluid from the regeneration actuator to flow to the accumulator. Furthermore, the method includes controlling, with the computing system, the operation of the first valve such that the driven actuator moves the tool toward the second position. Additionally, the method includes controlling, with the computing system, the operation of the second valve such that, when the tool moves toward the second position, the second valve opens to allow hydraulic fluid from the accumulator to flow to the regeneration actuator.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
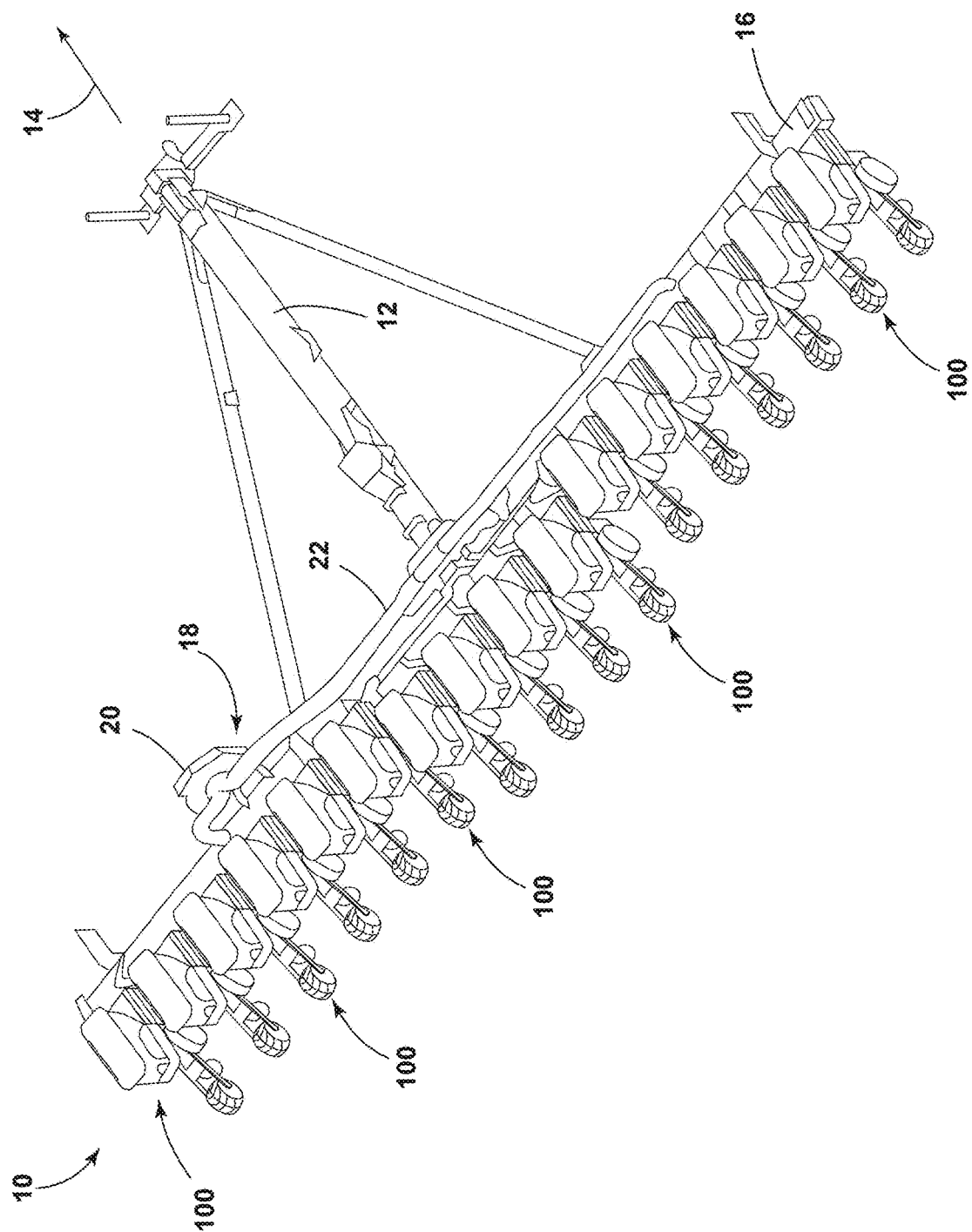
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system and a method for controlling the operation of an agricultural implement. As will be described below, the agricultural implement includes a tool moveable between a first or lowered position at which the tool engages soil within a field and a second or raised position at which the tool is positioned above the soil. For example, in embodiments in which the agricultural implement is configured as a seed-planting implement, the tool may be one or more row units. Conversely, in embodiments in which the agricultural implement is configured as a tillage implement, the tool may be one or more basket assemblies.

The system includes a driven actuator and a regeneration actuator coupled to the tool. More specifically, the driven actuator includes a driven rod coupled to the tool such that the driven actuator is configured to move the tool between the first and second positions. Furthermore, the regeneration actuator includes a regeneration rod coupled to the tool such that the regeneration rod moves when the driven rod moves. For example, when the driven rod extends outward from the driven actuator, the regeneration rod similarly extends outward from the regeneration actuator. Conversely, when the driven rod retracts into the driven actuator, the regeneration rod similarly retracts into the regeneration actuator.

Additionally, the disclosed system includes the accumulator fluidly coupled to the regeneration cylinder. In this respect, when the driven rod moves the tool toward the lowered position, the regeneration actuator supplies hydraulic fluid to the accumulator. That is, the movement of the tool toward the lowered position causes movement of the regeneration rod, which, in turn, forces hydraulic fluid from a chamber of the regeneration actuator into the accumulator. Conversely, when the driven rod moves the tool toward the raised position, the accumulator supplies the hydraulic fluid to the regeneration cylinder. That is, in such instances, hydraulic fluid from the accumulator flows into the chamber of the regeneration actuator, which causes movement of the regeneration rod. Such movement of the regeneration rod, in turn, assists in moving the tool toward the raised position, thereby reducing the load on the driven actuator.

The disclosed system and method improve the operation of the agricultural implement. More specifically, in conventional systems, moving the tool from the lowered position to the raised position requires a substantial amount of power, thereby necessitating the use of large hydraulic actuators. Furthermore, such movement is relatively short in duration and infrequent. The use of such large hydraulic actuators for infrequent and short durations increases the cost and energy consumption of the implement. However, as described above, with the disclosed system and method, the weight of the tool is used by the regeneration actuator to pressurize the accumulator when moving the tool from the raised position to the lowered position. Thereafter, when moving the tool from the lowered position to the raised position, the pressurized hydraulic fluid is released from the accumulator and flows into the regeneration actuator to assist in the lifting of the tool. This, in turn, reduces the load on the driven actuator, thereby allowing its size to be reduced, which decreases the cost and energy consumption of the agricultural implement.

Referring now to the drawings, FIG. 1 illustrates a perspective view of one embodiment of an agricultural implement 10. In the illustrated embodiment, the agricultural implement 10 is configured as a seed-planting implement (e.g., a planter). However, in alternative embodiments, the agricultural implement 10 may generally correspond to any suitable agricultural equipment or implement, such as a tillage implement.

As shown in FIG. 1, the agricultural implement 10 includes a tow bar 12. In general, the tow bar 12 is configured to couple to a tractor or other agricultural vehicle (not shown), such as via a suitable hitch assembly (not shown). In this respect, the tractor may tow the agricultural implement 10 across a field in a direction of travel 14 to perform an agricultural operation (e.g., a seed-planting operation) on the field.

Furthermore, the agricultural implement 10 includes a toolbar 16 coupled to the aft end of the tow bar 12. More specifically, the toolbar 16 is configured to support and/or couple to one or more components of the agricultural implement 10. For example, the toolbar 16 is configured to support one or more seed-planting units or row units 100. As will be described below, each row unit 100 is configured to form a furrow having a selected depth within the soil of the field. Thereafter, each row unit 100 deposits seeds within the corresponding furrow and subsequently closes the corresponding furrow after the seeds have been deposited, thereby establishing rows of planted seeds.

In general, the agricultural implement 10 may include any number of row units 100. For example, in the illustrated embodiment, the agricultural implement 10 includes sixteen row units 100 coupled to the toolbar 16. However, in other embodiments, the agricultural implement 10 may include six, eight, twelve, twenty-four, thirty-two, or thirty-six row units 100.

Additionally, in some embodiments, the agricultural implement 10 includes a vacuum system 18. In general, the vacuum system 18 is configured to supply vacuum pressure to the individual row units 100. As such, the vacuum system 18 may include a fan or other pressurized air source 20 and a plurality of vacuum conduits 22 extending between the fan 20 and the row units 100. In this respect, the vacuum pressure generated by the fan 20 may be used to pick up seeds onto the seed meters (not shown) of the individual row units 100. However, the seeds may be provided to the row units 100 in any other suitable manner. For example, in some alternative embodiments, the seed meters may be pressure-based.

Figure 2:
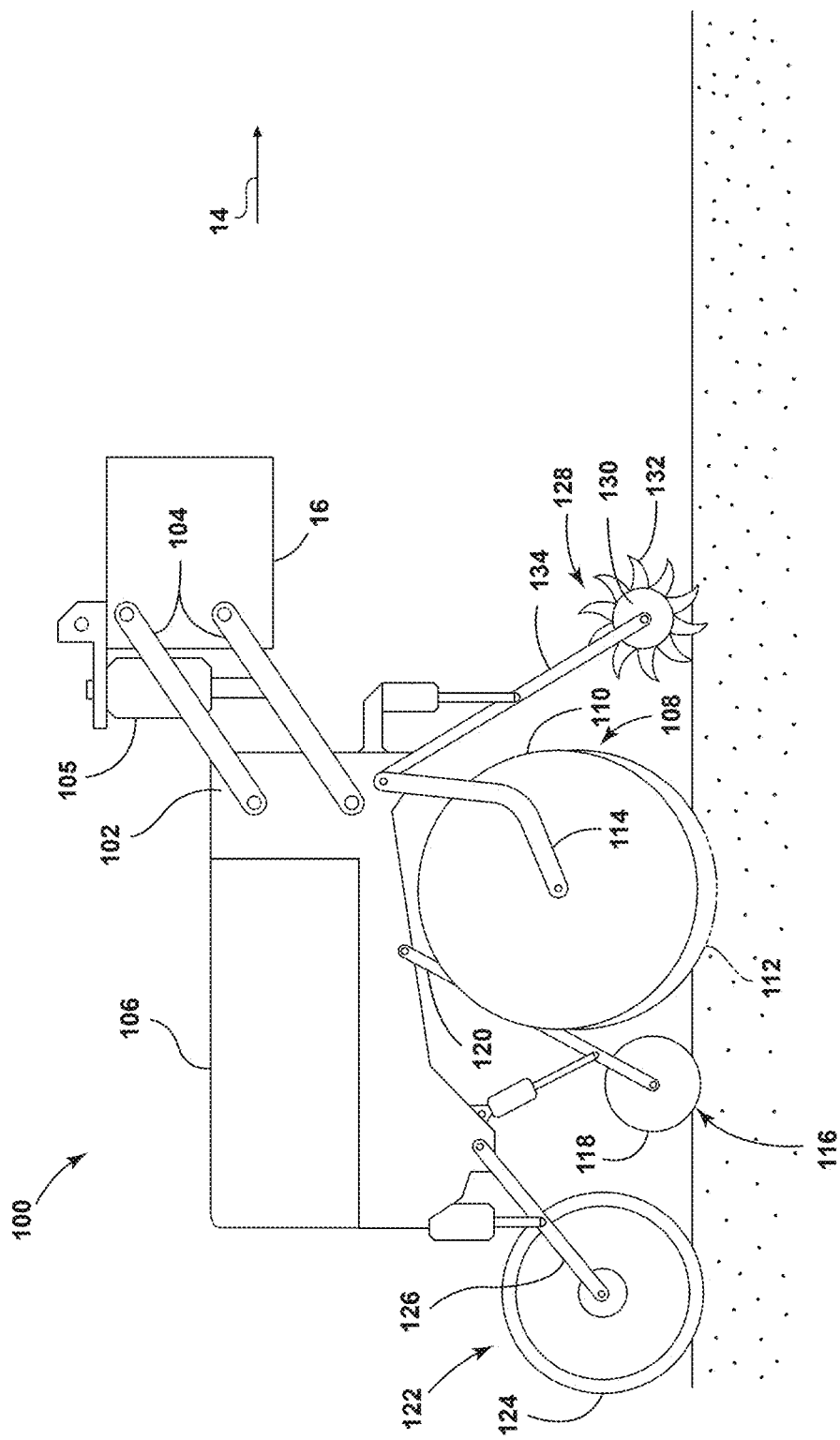
FIG. 2 illustrates a side view of one embodiment of a row unit of an agricultural implement in accordance with aspects of the present subject matter.

FIG. 2 illustrates a side view of one embodiment of a row unit 100 of the agricultural implement 10. As shown, the row unit 100 includes a row unit frame 102 adjustably coupled to the toolbar 16 by links 104. For example, one end of each link 104 may be pivotably coupled to the row unit frame 102, while the opposed end of each link 104 may be pivotably coupled to the toolbar 16. In this respect, an actuator 105 (e.g., a hydraulic cylinder) may be coupled between the toolbar 16 and the row unit frame 102. As such, the actuator 105 may be configured to move the row unit 100 relative to the toolbar 16 between a first or lowered position and a second or raised position. When at the lowered position, the row unit 100 engages the soil within a field, such as when performing the agricultural operation. Conversely, when at the raised position, the row unit 100 is lifted out of or otherwise positioned above the soil, such as when the implement 10 is traveling in a headlands or along a road. However, in alternative embodiments, the row unit 100 may be coupled to the toolbar 16 in any other suitable manner. Furthermore, a hopper 106 may be coupled to or otherwise supported on the row unit frame 102 and configured to store seeds (e.g., that are received from a bulk storage tank or filled individually).

Moreover, the row unit 100 also includes a furrow opening assembly 108. For example, in one embodiment, the furrow opening assembly 108 may include a gauge wheel 110 and a furrow-forming tool, such as one or more disk openers 112, which is configured to excavate a furrow or trench in the soil. In general, the gauge wheel 110 is configured to engage the top surface of the soil as the implement 10 is moved across the field. As such, the height of the disk opener(s) 112 may be adjusted with respect to the position of the gauge wheel 110 to set the depth of the furrow being excavated. Furthermore, the furrow opening assembly 108 may include a support arm 114 configured to adjustably couple the gauge wheel 110 to the row unit frame 102. For example, one end of the support arm 114 may be rotatably coupled to the gauge wheel 110, while an opposed end of the support arm 114 may be pivotably coupled to the row unit frame 102. Additionally, the disk opener(s) 112 may be rotatably coupled (e.g., bolted) to the row unit frame 102. However, in alternative embodiments, the gauge wheel 110 and the disk opener(s) 112 may be coupled to the row unit frame 102 in any other suitable manner. In addition, in other embodiments, the furrow opening assembly 108 may include any other suitable type of furrow-forming tool(s), such as a hoe(s).

Furthermore, the row unit 100 may include a furrow closing assembly 116. Specifically, in several embodiments, the furrow closing assembly 116 may include a pair of closing disks 118 (only one of which is shown) positioned relative to each other to permit soil to flow between the disks 118 as the implement 10 travels across the field. In this regard, the closing disks 118 are configured to close the furrow after seeds have been deposited therein, such as by collapsing the excavated soil into the furrow. Moreover, the furrow closing assembly 116 may include a support arm 120 configured to adjustably couple the closing disks 118 to the row unit frame 102. For example, one end of the support arm 120 may be rotatably coupled to the closing disks 118, while the opposed end of the support arm 120 may be pivotably coupled to the row unit frame 102. However, in alternative embodiments, the closing disks 118 may be coupled to the row unit frame 102 in any other suitable manner. Moreover, in alternative embodiments, the furrow closing assembly 116 may include any other suitable components for closing the furrow, such as a pair of closing wheels (not shown). Furthermore, in some embodiments, the row unit 100 may not include the furrow closing assembly 116.

Additionally, the row unit 100 may include a press wheel assembly 122. Specifically, in several embodiments, the press wheel assembly 122 may include a press wheel 124 configured to roll over the closed furrow to firm the soil over the seed and promote favorable seed-to-soil contact. In embodiments in which the row unit 100 does not include the furrow closing assembly 116, the press wheel assembly 122 may close the furrow after seeds have been deposited therein. Furthermore, the press wheel assembly 122 may include a support arm 126 configured to adjustably couple the press wheel 124 to the row unit frame 102. For example, one end of the support arm 126 may be rotatably coupled to the press wheel 124, while the opposed end of the support arm 126 may be pivotably coupled to the row unit frame 102. However, in alternative embodiments, the press wheel 124 may be coupled to the row unit frame 102 in any other suitable manner. Moreover, in some embodiments, the row unit 100 may not include the press wheel assembly 122.

Furthermore, the row unit 100 includes a row cleaner assembly 128 positioned forward of the disk opener(s) 112 relative to the direction of travel 14. In this regard, the row cleaner assembly 128 may be configured to break up and/or sweep away residue, dirt clods, trash, and/or other debris from the path of the row unit 100 before the furrow is formed in the soil. For example, in one embodiment, the row cleaner assembly 128 may include one or more row cleaner wheels 130, with each wheel 130 having a plurality of tillage points or fingers 132. As such, the row cleaner wheel(s) 130 may be positioned relative to the soil surface such that the wheel(s) 130 roll relative to the field as the implement 10 travels across the field, thereby allowing the fingers 132 to break up and/or sweep away residue, dirt clods, trash, and/or other debris. Additionally, the row cleaner assembly 128 may include a row cleaner arm 134 configured to adjustably couple the row cleaner wheel(s) 130 to the row unit frame 102. For example, one end of the row cleaner arm 134 may be rotatably coupled to the row cleaner wheel(s) 130, while an opposed end of the row cleaner arm 134 may be pivotably coupled to the row unit frame 102.

The configuration of the agricultural implement 10 described above and shown in FIGS. 1 and 2 is provided only to place the present subject matter in an exemplary field of use. Thus, the present subject matter may be readily adaptable to any manner of seed-planting implement configuration.

Figure 3:
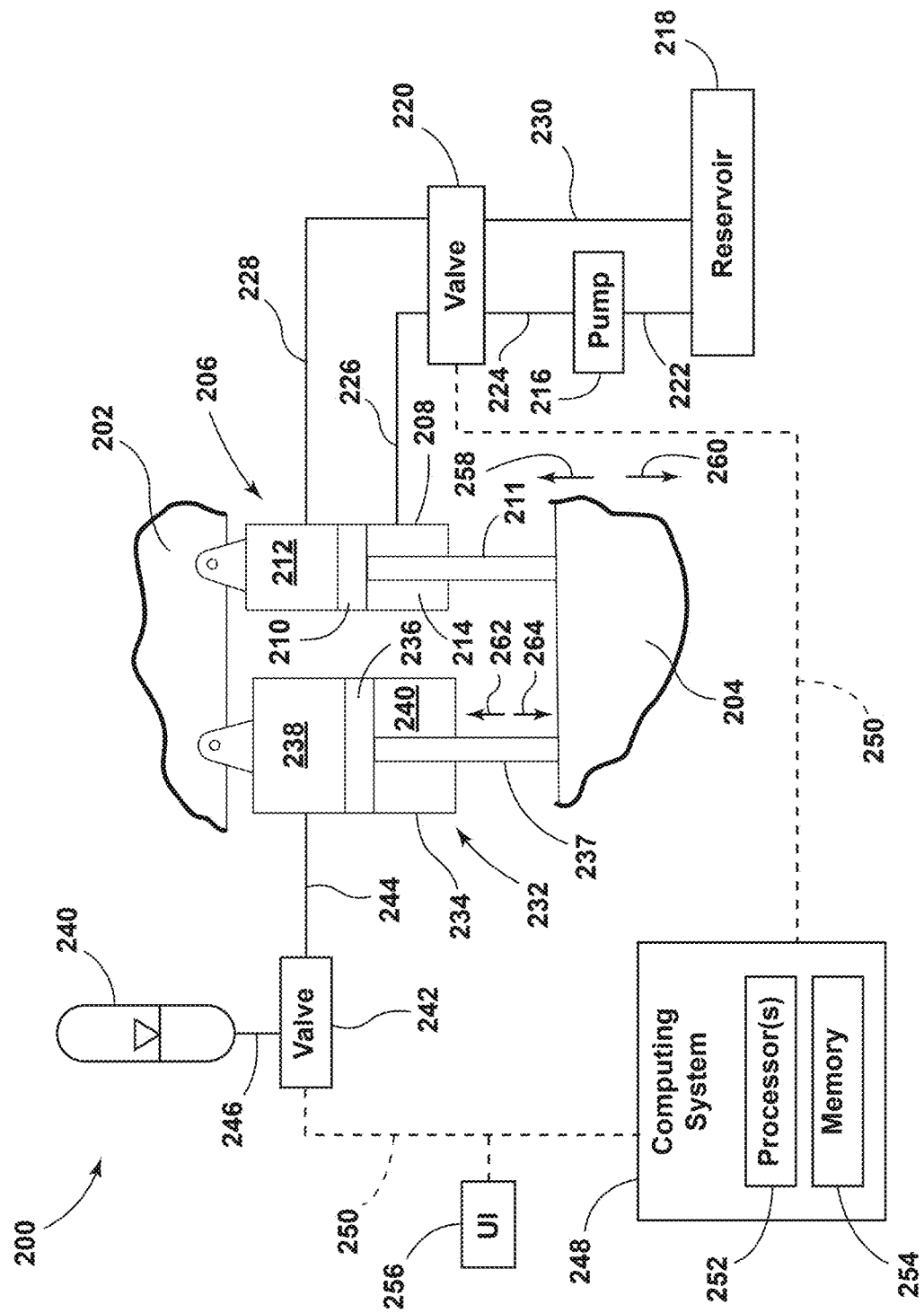
FIG. 3 illustrates a schematic view of one embodiment of a system for controlling the operation of an agricultural implement in accordance with aspects of the present subject matter.

Referring now to FIG. 3, a schematic view of one embodiment of a system 200 for controlling the operation of an agricultural implement is illustrated in accordance with aspects of the present subject matter. In general, the system 200 will be described herein with reference to the agricultural implement 10 described above with reference to FIGS. 1 and 2. However, it should be appreciated by those of ordinary skill in the art that the disclosed system 200 may generally be utilized with agricultural implements having any other suitable implement configuration.

As shown in FIG. 3, the system 200 includes a frame of 202 of the agricultural implement 10. In general, the frame 202 is configured to couple to and/or support one or more components of the agricultural implement 10. For example, in one embodiment, the frame 202 may be configured as the toolbar 16 (FIGS. 1 and 2) of the implement 10. However, in alternative embodiments, the frame 202 may be configured as any suitable frame, frame portion, or frame member.

Furthermore, the system 200 includes a tool 204. In general, the tool 204 may be any component or combination of the components of the agricultural implement 10 that are moveable relative to the frame 202 between a first or lowered position and a second or raised position. When at the lowered position, the tool 204 (or a portion thereof) engages the soil within a field, such as when performing the agricultural operation (e.g., a seed-planting operation). Conversely, when at the raised position, the tool 204 is lifted out of or otherwise positioned above the soil, such as when the implement 10 is traveling in a headlands or along a road. For example, in one embodiment, the tool 204 may be configured as the row unit 100. In another embodiment in which the implement 10 is configured as a tillage implement, the tool 204 may be configured as one or more basket assemblies (not shown). However, in alternative embodiments, the tool 204 may be configured in any other suitable manner.

Additionally, the system 200 includes a driven actuator 206. In general, the driven actuator 206 is configured to move the tool 204 between the lowered and raised positions. As such, the driven actuator 206 is generally coupled between the frame 202 and the tool 204.

In several embodiments, the driven actuator 206 corresponds to a hydraulic actuator. As such, the driven actuator 206 may include a cylinder 208, a piston 210, and a driven rod 211. More specifically, the piston 210 is slidably positioned within the cylinder 208, with one end of the driven rod 211 coupled to the piston 210. The opposing end of the driven rod 211 extends outward from the cylinder 208. In the illustrated embodiment, the cylinder 208 is coupled to the frame 202, and the opposing end of the driven rod 211 is coupled to the tool 204. However, in alternative embodiments, the cylinder 208 may be coupled to the tool 204 and the opposing end of the driven rod 211 may be coupled to the frame 202. Furthermore, the cylinder 208 and the piston 210 define a first or cap-side chamber 212 and a second or rod-side chamber 214.

Moreover, the system 200 may include various components for supplying hydraulic fluid to the driven actuator 206. For example, in several embodiments, the system 200 may include a pump 216, a reservoir 218, and a first valve 220. In such an embodiment, the pump 216 may be configured to draw hydraulic fluid from the reservoir 218 via a conduit 222 and generate a flow of pressurized hydraulic fluid for eventual delivery to the driven actuator 206 via conduits 224, 226, 228. As such, the first valve 220 is configured to control the flow of the pressurized hydraulic fluid to the driven actuator 206. More specifically, in certain instances (e.g., when the tool 204 is at the lowered or raised positions and the operator has not provided an input to raise or lower the tool 204), the first valve 220 may be configured to prevent or otherwise halt the flow of hydraulic fluid into or out cap-side and rod-side chambers 212, 214, thereby preventing movement of the driven rod 211 relative to the cylinder 208 and, thus, the tool 204 relative to the frame 202. In other instances (e.g., when the tool 204 is being lowered or otherwise moved toward the lowered position), the first valve 220 is configured to supply the flow of pressurized hydraulic fluid to the rod-side chamber 214, thereby causing the driven rod 211 to retract into the cylinder 208 and lower the tool 204 relative to the frame 202 (e.g., as indicated by arrow 258). Hydraulic fluid in the cap-side chamber 212 is returned to the reservoir 218 via the conduit 228 and conduit 230. In further instances (e.g., when the tool 204 is being raised or otherwise moved toward the raised position), the first valve 220 is configured to supply the flow of pressurized hydraulic fluid to the cap-side chamber 212, thereby causing the driven rod 211 to further extend outward from the cylinder 208 and raise the tool 204 relative to the frame 202 (e.g., as indicated by arrow 260). Hydraulic fluid in the rod-side chamber 214 is returned to the reservoir 218 via the conduits 226, 230. However, in alternative embodiments in which the driven actuator 206 is mounted differently relative to the frame 202 and the tool 204, the driven actuator 206 and the first valve 220 may operate differently.

In addition, the system 200 includes a regeneration actuator 232. In general, the driven actuator 206 is configured to extend and retract as the driven actuator 206 extends and retracts to move the tool 204 between the lowered and raised positions. Thus, the driven actuator 206 is generally coupled between the frame 202 and the tool 204. As will be described below, the regeneration actuator 232 assists the driven actuator 206 when raising the tool 204, thereby reducing the load on the driven actuator 206 (and, thus, its size and cost).

In several embodiments, the regeneration actuator 232 corresponds to a hydraulic actuator. As such, the regeneration actuator 232 may include a cylinder 234, a piston 236, and a regeneration rod 237. More specifically, the piston 236 is slidably positioned within the cylinder 234, with one end of the regeneration rod 237 coupled to the piston 236. The opposing end of the regeneration rod 237 extends outward from the cylinder 234. In the illustrated embodiment, the cylinder 234 is coupled to the frame 202 and the opposing end of the regeneration rod 237 is coupled to the tool 204. However, in alternative embodiments, the cylinder 234 may be coupled to the tool 204 and the opposing end of the regeneration rod 237 may be coupled to the frame 202. Furthermore, the cylinder 234 and the piston 236 define a first or cap-side chamber 238 and a second or rod-side chamber 238. In the embodiment shown, the cap-side chamber 238 is filled with a pressurized volume of hydraulic fluid, while the rod-side chamber 238 is devoid of pressurized hydraulic fluid.

Furthermore, as mentioned above, the regeneration rod 237 of the regeneration actuator 232 is configured to move with the driven rod 211 of the driven actuator 206 (e.g., in unison). Thus, in several embodiments, the regeneration actuator 232 may generally be mounted or otherwise oriented in parallel with the driven actuator 206. More specifically, in certain instances (e.g., when the tool 204 is at the lowered or raised positions and the operator has not provided an input to raise or lower the tool 204), the driven rod 211 does not move relative to the cylinder 208 of the driven actuator 206 (and the tool 204 does not move relative to the frame 202). In such instances, the regeneration rod 237 does not move relative to the cylinder 234 of the regeneration actuator 232. In other instances (e.g., when the tool 204 is being lowered or otherwise moved toward the lowered position), the driven rod 211 retracts into the cylinder 208 and lowers the tool 204 relative to the frame 202 (e.g., as indicated by arrow 258). In such instances, the downward movement of the tool 204 relative to the frame 202 causes the regeneration rod 237 to similarly retract into the cylinder 234 of the regeneration actuator 232 (e.g., as indicated by arrow 262). In further instances (e.g., when the tool 204 is being raised or otherwise moved toward the raised position), the driven rod 211 further extends outward from the cylinder 208 and raises the tool 204 relative to the frame 202 (e.g., as indicated by arrow 260). In such instances, the upward movement of the tool 204 relative to the frame 202 causes the regeneration rod 237 to similarly further extend outward from the cylinder 234 of the regeneration actuator 232 (e.g., as indicated by arrow 264). However, in alternative embodiments, the regeneration actuator 232 may be mounted in any other suitable manner relative to the driven actuator 206, which allows the regeneration rod 237 to move with the driven rod 211. Moreover, in several embodiments, the regeneration actuator 232 is larger (e.g., has a larger diameter) than the driven actuator 206.

Additionally, the system 200 includes an accumulator 240 fluidly coupled to the regeneration actuator 232. In general, the accumulator 240 is configured to selectively receive pressurized hydraulic fluid from and supply pressurized hydraulic fluid to the regeneration actuator 232. As will be described below, the selective receiving and supplying of pressurized hydraulic fluid to the regeneration actuator reduces the load on the driven actuator 206 when the driven actuator 206 raises the tool 204 relative to the frame 202. For example, in the illustrated embodiment, the accumulator 240 is fluidly coupled to the cap-side chamber 238 of the regeneration actuator 232 via conduits 244, 246. However, in alternative embodiments, the accumulator 240 is fluidly coupled to the rod-side chamber 238 of the regeneration actuator 232.

The accumulator 240 may have any suitable structure or configuration that allows the accumulator 240 to receive, store, and discharge pressurized hydraulic fluid. For example, in several embodiments, the accumulator 240 may be configured as a bladder-type accumulator. In such embodiments, the accumulator 240 may include a tank (not shown) defining an internal chamber (not shown) partially occupied by a pressurized bag (not shown). As pressurized hydraulic fluid enters the internal chamber, such fluid compresses the bag. Thereafter, when supplying fluid to the regeneration actuator 232, the compressed bag forces the hydraulic fluid out of the internal chamber.

Moreover, the system 200 includes a second valve 242 fluidly coupled to the regeneration actuator 232 and the accumulator 240. In general, the second valve 242 is configured to control the flow of the pressurized hydraulic fluid between the regeneration actuator 232 and the accumulator 240. More specifically, pressurized hydraulic fluid from the regeneration actuator 232 is supplied to the accumulator 240 when lowering the tool 204. Conversely, pressurized hydraulic fluid from the accumulator 240 to the regeneration actuator 232 when raising the tool 204.

For example, in the illustrated embodiment, the second valve 242 is fluidly coupled to the cap-side chamber 238 of the regeneration actuator 232 via the conduit 244 and the accumulator 240 via the conduit 246. As such, in certain instances (e.g., when the tool 204 is at the lowered or raised positions and the operator has not provided an input to raise or lower the tool 204), the second valve 242 may be configured to prevent or otherwise halt the flow of hydraulic fluid into or out of the accumulator 240. In other instances (e.g., when the tool 204 is being lowered or otherwise moved toward the lowered position), the second valve 242 is configured to allow pressurized hydraulic fluid to flow from the cap-side chamber 238 of the regeneration actuator 232 into the accumulator 240 (e.g., due to the movement of the piston 236 within the cylinder 234). This, in turn, charges the accumulator 240 with pressurized hydraulic fluid for later use. In further instances (e.g., when the tool 204 is being raised or otherwise moved toward the raised position), the second valve 242 is configured to supply pressurized hydraulic fluid from the accumulator 240 to the cap-side chamber 238 of the regeneration actuator 232. This, in turn, causes the piston 236 and the regeneration rod 237 to further extend outward from the cylinder 234, thereby assisting the driven rod 211 in raising the tool 204 relative to the frame 202 (e.g., as indicated by arrow 260). However, in alternative embodiments in which the regeneration actuator 232 is mounted differently relative to the frame 202 and the tool 204, the regeneration actuator 232 and the second valve 242 may operate differently.

The system 200 has been described above in the context of a single tool 204 that is moveable relative to the frame 202 via a single driven actuator 206 and a single regeneration actuator 232 for simplicity and clarity. However, the system 200 includes any number of tools 204, frames 202, and associated driven and regeneration actuators 206, 232.

In addition, the system 200 includes a computing system 248 communicatively coupled to one or more components of the agricultural implement 10, an associated work vehicle (not shown), and/or the system 200 to allow the operation of such components to be electronically or automatically controlled by the computing system 248. For instance, the computing system 248 may be communicatively coupled to the first valve 220 via a communicative link 250. As such, the computing system 248 may be configured to control the operation of the first valve 220 to control the flow of hydraulic fluid to the driven actuator 206. Moreover, the computing system 248 may be communicatively coupled to the second valve 242 via the communicative link 250. As such, the computing system 248 may be configured to control the operation of the second valve 242 to control the flow of hydraulic fluid between the regeneration actuator 232 and the accumulator 240. In addition, the computing system 248 may be communicatively coupled to any other suitable components of the agricultural implement 10, an associated work vehicle, and/or the system 200.

In general, the computing system 248 may include one or more processor-based devices, such as a given controller or computing device or any suitable combination of controllers or computing devices. Thus, in several embodiments, the computing system 248 may include one or more processor(s) 252 and an associated memory device(s) 254 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 254 of the computing system 248 may generally comprise memory element(s) including, but not limited to, a computer-readable medium (e.g., random access memory RAM)), a computer-readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 254 may generally be configured to store suitable computer-readable instructions that, when implemented by the processor(s) 252, configure the computing system 248 to perform various computer-implemented functions, such as one or more aspects of the methods and algorithms that will be described herein. In addition, the computing system 248 may also include various other suitable components, such as a communications circuit or module, one or more input/output channels, a data/control bus, and/or the like.

The various functions of the computing system 248 may be performed by a single processor-based device or may be distributed across any number of processor-based devices, in which instance such devices may be considered to form part of the computing system 248. For instance, the functions of the computing system 248 may be distributed across multiple application-specific controllers or computing devices, such as a navigation controller, an engine controller, a transmission controller, an implement controller, and/or the like.

Furthermore, the system 200 may also include a user interface 256. More specifically, the user interface 256 may be configured to receive inputs (e.g., inputs associated with a selected position of the tool 204) from the operator. As such, the user interface 256 may include one or more input devices, such as touchscreens, keypads, touchpads, knobs, buttons, sliders, switches, mice, microphones, and/or the like, which are configured to receive inputs from the operator. The user interface 256 may, in turn, be communicatively coupled to the computing system 248 via the communicative link 250 to permit the received inputs to be transmitted from the user interface 256 to the computing system 248. In addition, some embodiments of the user interface 256 may include one or more feedback devices (not shown), such as display screens, speakers, warning lights, and/or the like, which are configured to provide feedback from the computing system 248 to the operator. In one embodiment, the user interface 256 may be mounted or otherwise positioned within a cab (not shown) of a work vehicle (not shown) configured to tow the agricultural implement 10. However, in alternative embodiments, the user interface 256 may mounted at any other suitable location.

Figure 4:
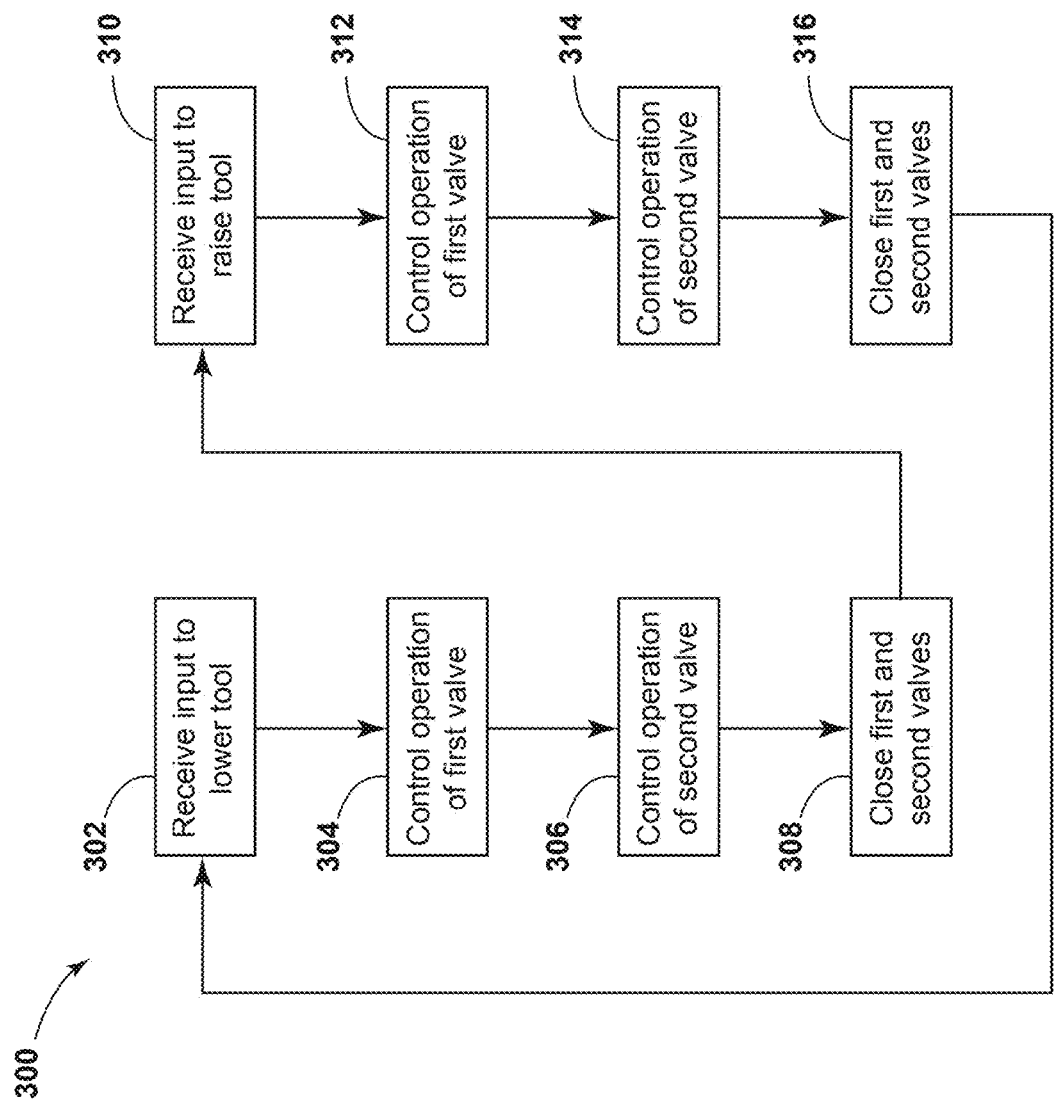
FIG. 4 illustrates a flow diagram providing one embodiment of control logic for controlling the operation of an agricultural implement in accordance with aspects of the present subject matter.

Referring now to FIG. 4, a flow diagram of one embodiment of control logic 300 that may be executed by the computing system 248 (or any other suitable computing system) for controlling the operation of an agricultural implement is illustrated in accordance with aspects of the present subject matter. Specifically, the control logic 300 shown in FIG. 4 is representative of steps of one embodiment of an algorithm that can be executed to raise and lower one or more tools of an agricultural implement in a manner that reduces the size and energy consumption of the driven actuator that raises and lowers the tool(s). However, in other embodiments, the control logic 300 may be used in association with any other suitable system, application, and/or the like for controlling the operation of an agricultural implement.

The control logic 300 will be described below in the context of using a single driven actuator and a single regeneration actuator to move a single tool of an agricultural implement relative to the frame 202 for simplicity and clarity. However, the control logic 300 may be used to move any number of tools relative to the frame 202 using any number of driven and regeneration actuators.

As shown in FIG. 4, at (302), the control logic 300 includes receiving an operator input indicative of lowering a tool of an agricultural implement relative to a frame of the agricultural implement. Specifically, as mentioned above, in several embodiments, the computing system 248 may be communicatively coupled to the user interface 256 via the communicative link 250. In this respect, the operator may provide one or more inputs to the user interface 256, with such input(s) being indicative of the operator's desire to lower the tool 204 by moving the tool from the second or raised position to the first or lowered position. Thereafter, the operator input(s) may be transmitted from the user interface 256 to the computing system 248 via the communicative link 250. Alternatively, the computing system 248 may receive the input(s) from any other suitable device(s), such as a remote computing device(s) (e.g., a Smartphone, a remote database server, etc.) or a sensor(s).

Furthermore, at (304), the control logic 300 includes controlling the operation of a first valve of the agricultural implement such that a driven actuator of the agricultural implement moves the tool toward the first position. Specifically, as mentioned above, in several embodiments, the computing system 248 may be communicatively coupled to the first valve 220 via the communicative link 250. In this respect, in response to the receipt of the input at (302), the computing system 248 is configured to transmit control signals to the first valve 220 via the communicative link 250. Such control signals, in turn, instruct the first valve 220 to operate such that the driven actuator 206 moves the tool 204 toward the first or lowered position. For example, in one embodiment, upon receipt of the control signals, the first valve 220 may operate such that the flow of pressurized hydraulic fluid from the pump 216 is directed to the rod-side chamber 214 via the conduit 226. Moreover, upon receipt of the control signals, the first valve 220 may operate such that pressurized hydraulic fluid from the cap-side chamber 212 flows back to the reservoir 218 via the conduits 228, 230. This, in turn, causes the piston 210 to move relative to the cylinder 208 of the driven actuator 206 such that the driven rod 211 retracts into the cylinder 208, thereby lowering the tool 204 relative to the frame 202 toward the first or lowered position.

Additionally, at (306), the control logic 300 includes controlling the operation of a second valve of the agricultural implement such that, when the tool moves toward the first position, the second valve opens to allow the hydraulic fluid from a regeneration actuator of the agricultural implement to flow to an accumulator of the agricultural implement. Specifically, as mentioned above, in several embodiments, the computing system 248 may be communicatively coupled to the second valve 242 via the communicative link 250. In this respect, in response to the receipt of the input at (302), the computing system 248 is configured to transmit control signals to the second valve 242 via the communicative link 250. Such control signals, in turn, instruct the second valve 242 to open such that hydraulic fluid can flow from the cap-side chamber 238 of the regeneration actuator 232 to the accumulator 240. Thus, when the tool 204 moves toward the first or lowered position, such movement causes the regeneration rod 237 to retract into the cylinder 234 of the regeneration actuator 232. This retraction of the regeneration rod 237 moves the piston 236 relative to the cylinder 234, shrinking the size of the cap-side chamber 238 and forcing hydraulic fluid from the cap-side chamber 238 through the opened second valve 242 and into the accumulator 240.

Moreover, at (306), in some embodiments, when the tool 204 moves from the second or raised position toward the first or lowered position, the computing system 248 is configured to control the operation of the second valve 242 such that the second valve 242 moves from its closed position to its opened position across a time period of at least one second. This gradual opening of the second valve 242, in turn, prevents the tool 204 from dropping quickly relative to the position of the frame 202 when lowering first occurs, thereby providing a smoother lowering operation.

(304) and (306) are shown as separate ordered steps in FIG. 4 for illustration purposes only. However, in practice, (304) and (306) are performed simultaneously to prevent the regeneration actuator 232 from being hydraulically locked.

In addition, at (308), the control logic 300 includes closing the first and second valves. Specifically, in several embodiments, when the tool 204 reaches the first or lowered position, the computing system 248 is configured to control the operation of the first valve 220 such that the first valve 220 halts the flow of hydraulic fluid to or from the driven actuator 206, thereby preventing further movement of the tool 204 relative to the frame 202. Moreover, in several embodiments, when the tool 204 reaches the first or lowered position, the computing system 248 is configured to control the operation of the second valve 242 such that the second valve 242 halts the flow of the hydraulic fluid between the regeneration actuator 232 and the accumulator 240.

As shown in FIG. 4, at (310), the control logic 300 includes receiving an operator input indicative of raising the tool relative to the frame. Specifically, in several embodiments, the operator may provide one or more inputs to the user interface 256, with such input(s) being indicative of the operator's desire to raise the tool 204 by moving the tool from the first or lowered position to the second or raised position. Thereafter, the operator input(s) may be transmitted from the user interface 256 to the computing system 248 via the communicative link 250. Alternatively, the computing system 248 may receive the input(s) from any other suitable device(s), such as a remote computing device(s) (e.g., a Smartphone, a remote database server, etc.) or a sensor(s).

Furthermore, at (312), the control logic 300 includes controlling the operation of the valve such that a driven actuator moves the tool toward the second or raised position. Specifically, in several embodiments, in response to the receipt of the input at (310), the computing system 248 is configured to transmit control signals to the first valve 220 via the communicative link 250. Such control signals, in turn, instruct the first valve 220 to operate such that the driven actuator 206 moves the tool 204 toward the second or raised position. For example, in one embodiment, upon receipt of the control signals, the first valve 220 may operate such that the flow of pressurized hydraulic fluid from the pump 216 is directed to the cap-side chamber 212 via the conduit 228. Moreover, upon receipt of the control signals, the first valve 220 may operate such that pressurized hydraulic fluid from the rod-side chamber 214 flows back to the reservoir 218 via the conduits 226, 230. This, in turn, causes the piston 210 to move relative to the cylinder 208 of the driven actuator 206 such that the driven rod 211 further extends outward from the cylinder 208, thereby raising the tool 204 relative to the frame 202 toward the second or raised position.

Additionally, at (314), the control logic 300 includes controlling the operation of the second valve such that, when the tool moves toward the second or raised position, the second valve opens to allow the hydraulic fluid from the accumulator to flow to the regeneration actuator. Specifically, in several embodiments, in response to the receipt of the input at (310), the computing system 248 is configured to transmit control signals to the second valve 242 via the communicative link 250. Such control signals, in turn, instruct the second valve 242 to open such that hydraulic fluid can flow from the accumulator 240 to the cap-side chamber 238 of the regeneration actuator 232. Thus, when the tool 204 moves toward the second or raised position, such movement causes the regeneration rod 237 to further extend outward from the cylinder 234 of the regeneration actuator 232. This extension of the regeneration rod 237 assists the driven actuator 206 in raising the tool 204 to the second or raised position. Thus, the use of the accumulator 240 and the regeneration actuator 232 reduces the load on the driven actuator 206, thereby allowing for the use of a smaller driven actuator 206. A smaller driven actuator, in turn, uses less energy and is less expensive than conventional actuators used to raise tools of an agricultural implement.

Moreover, at (314), in some embodiments, when the tool 204 moves from the first or lowered position toward the second or raised position, the computing system 248 is configured to control the operation of the second valve 242 such that the second valve 242 moves from its closed position to its opened position across a time period of at least one second. This gradual opening of the second valve 242, in turn, prevents the tool 204 from initially raising too quickly relative to the position of the frame 202 (e.g., "jumping" or "popping" up) when raising first occurs, thereby providing a smoother raising operation.

(312) and (314) are shown as separate ordered steps in FIG. 4 for illustration purposes only. However, in practice, (312) and (314) are performed simultaneously to prevent the regeneration actuator 232 from being hydraulically locked.

In addition, at (316), the control logic 300 includes closing the first and second valves. Specifically, in several embodiments, when the tool 204 reaches the second or raised position, the computing system 248 is configured to control the operation of the first valve 220 such that the first valve 220 halts the flow of hydraulic fluid to or from the driven actuator 206, thereby preventing further movement of the tool 204 relative to the frame 202. Moreover, in several embodiments, when the tool 204 reaches the second or raised position, the computing system 248 is configured to control the operation of the second valve 242 such that the second valve 242 halts the flow of the hydraulic fluid between the regeneration actuator 232 and the accumulator 240. Upon completion of (316), the control logic 300 returns to (302).

Figure 5:
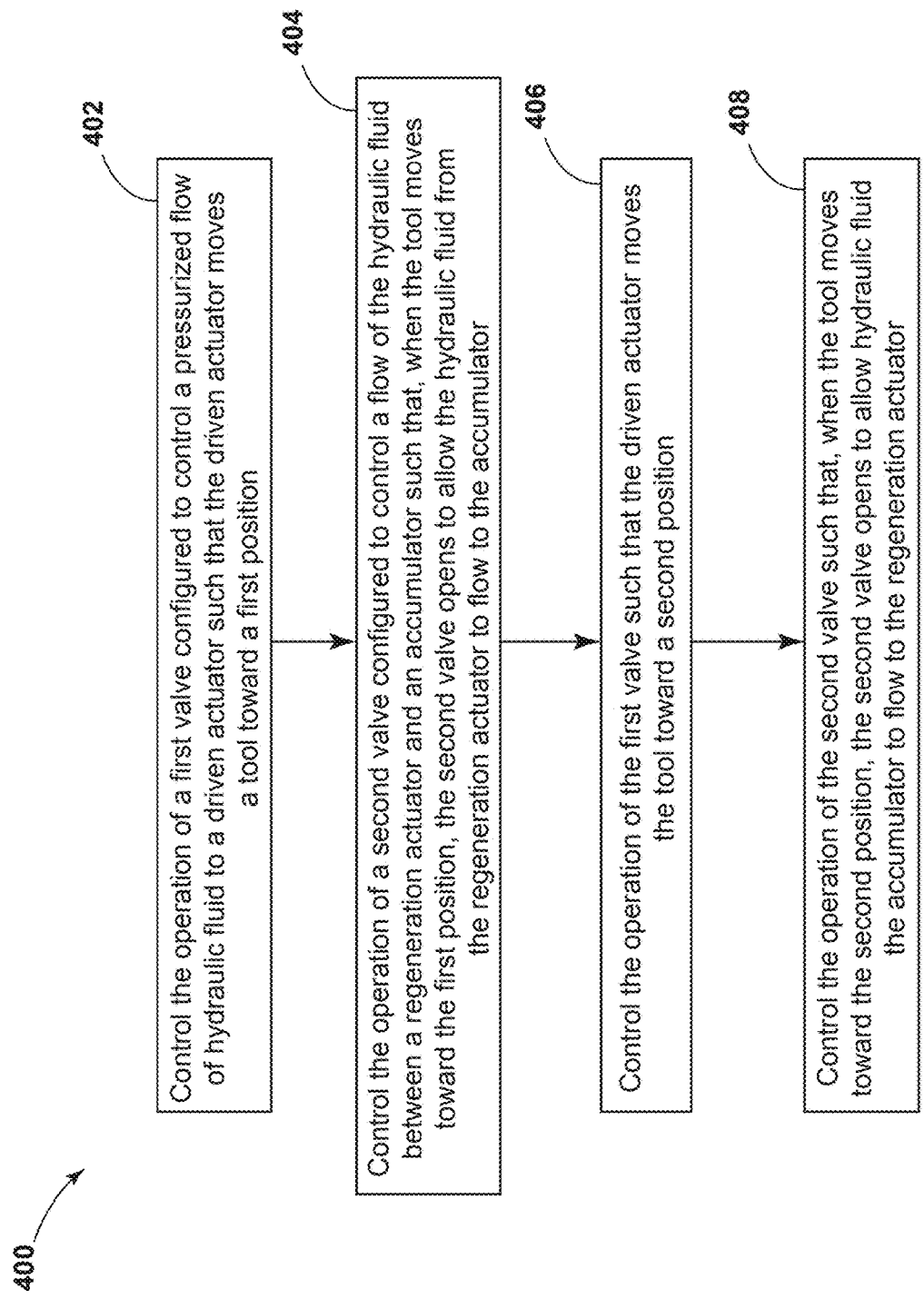
FIG. 5 illustrates a flow diagram of one embodiment of a method for controlling the operation of an agricultural implement in accordance with aspects of the present subject matter.

Referring now to FIG. 5, a flow diagram of one embodiment of a method 400 for controlling the operation of an agricultural implement is illustrated in accordance with aspects of the present subject matter. In general, the method 400 will be described herein with reference to the agricultural implement 10 and the system 200 described above with reference to FIGS. 1-4. However, it should be appreciated by those of ordinary skill in the art that the disclosed method 400 may generally be implemented with any agricultural implement having any suitable implement configuration and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 includes controlling, with a computing system, the operation of a first valve configured to control a pressurized flow of hydraulic fluid to a driven actuator such that the driven actuator moves a tool toward a first position. For instance, as described above, the computing system 248 may be configured to control the operation of the first valve 220 such that the driven actuator 206 moves the tool 204 toward the first or lowered position.

Furthermore, at (404), the method 400 includes controlling, with the computing system, the operation of a second valve configured to control a flow of the hydraulic fluid between a regeneration actuator and an accumulator such that, when the tool moves toward the first position, the second valve opens to allow the hydraulic fluid from the regeneration actuator to flow to the accumulator. For instance, as described above, the computing system 248 may be configured to control the operation of the second valve 242 such that, when the tool 204 moves toward the first or lowered position, the second valve 242 opens to allow the hydraulic fluid from the regeneration actuator 232 to flow to the accumulator 240.

Additionally, at (406), the method 400 includes controlling, with the computing system, the operation of the first valve such that the driven actuator moves the tool toward the second position. For instance, as described above, the computing system 248 may be configured to control the operation of the first valve 220 such that the driven actuator 206 moves the tool 204 toward the second or raised position.

Moreover, at (408), the method 400 includes controlling, with the computing system, the operation of the second valve such that, when the tool moves toward the second position, the second valve opens to allow hydraulic fluid from the accumulator to flow to the regeneration actuator. For instance, as described above, the computing system 248 may be configured to control the operation of the second valve 242 such that, when the tool 204 moves toward the second position, the second valve 242 opens to allow hydraulic fluid from the accumulator 240 to flow to the regeneration actuator 232.

It is to be understood that the steps of the control logic 300 and the method 400 are performed by the computing system 248 upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system 248 described herein, such as the control logic 300 and the method 400, is implemented in software code or instructions that are tangibly stored on a tangible computer-readable medium. The computing system 248 loads the software code or instructions via a direct interface with the computer-readable medium or via a wired and/or wireless network. Upon loading and executing such software code or instructions by the computing system 248, the computing system 248 may perform any of the functionality of the computing system 248 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
   a frame;
   a tool supported on the frame, the tool moveable between a first position at which the tool engages soil within a field and a second position at which the tool is positioned above the soil;
   a driven actuator including a driven rod coupled to the tool such that the driven actuator is configured to move the tool between the first position and the second position;
   a regeneration actuator including a regeneration rod coupled to the tool such that the regeneration rod moves when the driven rod moves;
   an accumulator fluidly coupled to the regeneration cylinder such that, when the driven rod moves the tool toward the first position, the regeneration actuator supplies hydraulic fluid to the accumulator and, when the driven rod moves the tool toward the second position, the accumulator supplies the hydraulic fluid to the regeneration cylinder;
   a pump configured to supply a pressurized flow of the hydraulic fluid to the driven actuator;
   a first valve configured to control the pressurized flow of the hydraulic fluid to the driven cylinder;
   a second valve configured to control a flow of the hydraulic fluid between the regeneration actuator and the accumulator; and
   a computing system configured to:
      control an operation of the first valve such that the driven actuator moves the tool toward the first position; and
      control an operation of the second valve such that, when the tool moves toward the first position, the second valve opens to allow the hydraulic fluid from the regeneration actuator to flow to the accumulator.

2. The agricultural implement of claim 1, wherein the computing system is further configured to:
   control the operation of the first valve such that the driven actuator moves the tool toward the second position; and
   control the operation of the second valve such that, when the tool moves toward the second position, the second valve opens to allow the hydraulic fluid from the accumulator to flow to the regeneration actuator.

3. The agricultural implement of claim 1, wherein the accumulator comprises a bladder accumulator.

4. A system for controlling an operation of an agricultural implement, the system comprising:
   a tool moveable between a first position at which the tool engages soil within a field and a second position at which the tool is positioned above the soil;

a driven actuator including a driven rod coupled to the tool such that the driven actuator is configured to move the tool between the first position and the second position;

a regeneration actuator including a regeneration rod coupled to the tool such that the regeneration rod moves when the driven rod moves;

an accumulator fluidly coupled to the regeneration cylinder such that, when the driven rod moves the tool toward the first position, the regeneration actuator supplies hydraulic fluid to the accumulator and, when the driven rod moves the tool toward the second position, the accumulator supplies the hydraulic fluid to the regeneration cylinder;

a pump configured to supply a pressurized flow of the hydraulic fluid to the driven actuator;

a first valve configured to control the pressurized flow of the hydraulic fluid to the driven cylinder;

a second valve configured to control a flow of the hydraulic fluid between the regeneration actuator and the accumulator; and a computing system configured to control an operation of the first valve and an operation of the second valve, wherein, when the tool is at the first position or the second position, the computing system is configured to control the operation of the second valve such that the second valve halts the flow of the hydraulic fluid between the regeneration actuator and the accumulator.

5. The system of claim 4, wherein, when controlling the operation of the first valve and the operation of the second valve, the computing system is configured to:

control the operation of the first valve such that the driven actuator moves the tool toward the first position; and control the operation of the second valve such that, when the tool moves toward the first position, the second valve opens to allow the hydraulic fluid from the regeneration actuator to flow to the accumulator.

6. The system of claim 4, wherein, when controlling the operation of the first valve and the operation of the second valve, the computing system is configured to:

control the operation of the first valve such that the driven actuator moves the tool toward the second position; and control the operation of the second valve such that, when the tool moves toward the second position, the second valve opens to allow the hydraulic fluid from the accumulator to flow to the regeneration actuator.

7. The system of claim 4, wherein, when the tool moves from the first position toward the second position or from the second position toward the first position, the computing system is configured to control the operation of the second valve such that the second valve moves from a closed position to an opened position across a time period of at least one second.

8. The system of claim 4, wherein the accumulator comprises a bladder accumulator.

9. The system of claim 4, wherein the regeneration actuator comprises a cylinder, a piston slidably positioned within the cylinder and coupled to the regeneration rod, the cylinder and piston defining a first chamber fluidly coupled to the accumulator, the cylinder and piston further defining a second chamber.

10. A method for controlling an operation of an agricultural implement, the agricultural implement including a tool moveable between a first position at which the tool engages soil within a field and a second position at which the tool is positioned above the soil, the agricultural implement further including a driven actuator configured to move the tool between the first position and the second position, the method comprising:

controlling, with a computing system, an operation of a first valve configured to control a pressurized flow of hydraulic fluid to the driven actuator such that the driven actuator moves the tool toward the first position;

controlling, with the computing system, an operation of a second valve configured to control a flow of the hydraulic fluid between a regeneration actuator and an accumulator such that, when the tool moves toward the first position, the second valve opens to allow the hydraulic fluid from the regeneration actuator to flow to the accumulator;

controlling, with the computing system, the operation of the first valve such that the driven actuator moves the tool toward the second position; and controlling, with the computing system, the operation of the second valve such that, when the tool moves toward the second position, the second valve opens to allow hydraulic fluid from the accumulator to flow to the regeneration actuator.

11. The method of claim 10, further comprising:

when the tool is at the first position, controlling, with the computing system, the operation of the second valve such that the second valve halts the flow of the hydraulic fluid between the regeneration actuator and the accumulator.

12. The method of claim 10, further comprising:

when the tool is at the second position, controlling, with the computing system, the operation of the second valve such that the second valve halts the flow of the hydraulic fluid between the regeneration actuator and the accumulator.

13. The method of claim 10, further comprising:

when the tool moves from the first position toward the second position, controlling, with the computing system, the operation of the second valve such that the second valve moves from a closed position to an opened position across a time period of at least one second.

14. The method of claim 10, further comprising:

when the tool moves from the second position toward the first position, controlling, with the computing system, the operation of the second valve such that the second valve moves from a closed position to an opened position across a time period of at least one second.

* * * * *